United States Patent
Zhou et al.

(10) Patent No.: US 11,674,381 B2
(45) Date of Patent: Jun. 13, 2023

(54) PREDICTION METHOD FOR COAL AND GAS OUTBURST BASED ON COMPARING BOREHOLE GAS FLOW CURVES

(71) Applicant: CHINA COAL TECHNOLOGY & ENGINEERING GROUP SHENYANG ENGINEERING COMPANY, Liaoning (CN)

(72) Inventors: Rui Zhou, Liaoning (CN); Kaijia Zhang, Liaoning (CN); Haisheng Qiu, Liaoning (CN); Hongzhen Zhang, Liaoning (CN); Xing Ni, Liaoning (CN); Zhongyu Zheng, Liaoning (CN); Zhigang Fan, Liaoning (CN); Shipeng Xue, Liaoning (CN); Peng Li, Liaoning (CN)

(73) Assignee: CHINA COAL TECHNOLOGY & ENGINERRING GROUP SHENYANG ENGINEERING COMPANY, Liaoning (CN)

( * ) Notice: Subject to any disclaimer, the term of this patent is extended or adjusted under 35 U.S.C. 154(b) by 0 days.

(21) Appl. No.: 17/684,107

(22) Filed: Mar. 1, 2022

(65) Prior Publication Data
US 2022/0316323 A1    Oct. 6, 2022

(30) Foreign Application Priority Data
Apr. 2, 2021 (CN) .......................... 202110360574.X

(51) Int. Cl.
E21B 47/10 (2012.01)
E21B 49/08 (2006.01)
(Continued)

(52) U.S. Cl.
CPC ............ *E21B 47/10* (2013.01); *E21B 49/087* (2013.01); *E21C 39/00* (2013.01); *G01V 99/00* (2013.01)

(58) Field of Classification Search
None
See application file for complete search history.

(56) References Cited

U.S. PATENT DOCUMENTS

| 9,417,358 B2 * | 8/2016 | Lin ...................... G01V 11/002 |
| 10,947,842 B2 * | 3/2021 | Wang ...................... E21B 47/10 |

(Continued)

FOREIGN PATENT DOCUMENTS

| CN | 105242016 A * | 1/2016 |
| CN | 105701712 A * | 6/2016 |

OTHER PUBLICATIONS

Liang Wang, Yuan-ping Cheng, Lei Wang, Pin-kun Guo, Wei Li, Safety line method for the prediction of deep coal-seam gas pressure and its application in coal mines, Safety Science, vol. 50, Issue 3, 2012, pp. 523-529, ISSN 0925-7535, https://doi.org/10.1016/j.ssci.2011.09.022 (Year: 2012).*

(Continued)

*Primary Examiner* — Lina Cordero
(74) *Attorney, Agent, or Firm* — Muncy, Geissler, Olds & Lowe, P.C.

(57) ABSTRACT

A prediction method for coal and gas outburst based on comparing borehole gas flow curves includes the following steps: constructing a seam-crossing borehole in the coal seam, measuring or calculating gas flow corresponding to critical gas pressure P, which is a reference gas flow $Q(t)_{reference}$; performing linear regression on the reference gas flow $Q(t)_{reference}$ to form a reference flow curve; constructing a predicted seam-crossing borehole in a predicted area, and directly testing a gas flow at each time t in a delayed manner, which is a predicted gas flow $Q(t)_{prediction}$; performing linear regression on the predicted gas flow $Q(t)_{prediction}$ to form a predicted flow curve; and judging (Continued)

whether the predicted flow curve is above the reference flow curve or whether the predicted flow curve intersects with the reference flow curve, and judging whether the coal seam in the predicted area has a risk of coal and gas outburst.

4 Claims, 4 Drawing Sheets

(51) Int. Cl.
*E21C 39/00* (2006.01)
*G01V 99/00* (2009.01)

(56) References Cited

U.S. PATENT DOCUMENTS

| | | | | |
|---|---|---|---|---|
| 2014/0019047 | A1* | 1/2014 | Lin | E21B 49/006 |
| | | | | 702/2 |
| 2015/0234092 | A1* | 8/2015 | Wu | E21B 47/10 |
| | | | | 703/2 |
| 2020/0200004 | A1* | 6/2020 | Wang | E21B 47/024 |
| 2020/0370433 | A1* | 11/2020 | Li | E21C 41/18 |

OTHER PUBLICATIONS

Zhou, Qinglong, Juan Herrera, and Arturo Hidalgo. "Development of a quantitative assessment approach for the coal and gas outbursts in coal mines using rock engineering systems." International Journal of Mining, Reclamation and Environment 33.1 (2019) : 21-41 (Year: 2019).*

* cited by examiner

PREDICTION METHOD FOR COAL AND GAS OUTBURST BASED ON COMPARING BOREHOLE GAS FLOW CURVES

BACKGROUND OF THE INVENTION

1. Field of the Invention

The present invention relates to the field of predicting coal and gas outburst for coal mines, and particularly to a prediction method for coal and gas outburst based on comparing borehole gas flow curves.

2. The Prior Arts

According to the survey of professional institutions, after coal resource integration from 2014 to 2017, there are still nearly 700 coal and gas outburst mines in China. With the continuous increase of coal mining depth, coal seam gas pressure and gas content continuously rise, the number of outburst mines will continue to increase, and the situation of gas disaster prevention and control is still severe. The mining practice of outburst coal seams in coal mines at home and abroad shows that the location of outburst disasters often has obvious regional characteristics, and the potentially dangerous areas in the outburst coal seams only account for 10%-30% of the total mining area. Therefore, the "Detailed Rules for Prevention and Control of Coal and Gas Outburst" clearly requires that outburst mines should perform regional outburst risk prediction for the mined outburst coal seams based on data including underground measured gas parameters, and divide the outburst coal seams into non-outburst danger areas and outburst danger areas to effectively guide the mining face design and mining production operations. It can be seen that the prediction of the risk of regional outburst is not only the first priority to reasonably prevent coal and gas outburst accidents and ensure safe production in mines, but also can effectively guide outburst prevention measures, reduce the quantity of gas prevention and control works, greatly improve the production and work efficiency of the outburst mines, and make the gas disaster prevention and control work run in a targeted manner.

Coal and gas outburst is an extremely complex dynamic phenomenon that occurs in the underground production process of the coal mines. Under the combined action of crustal stress and gas pressure, coal and gas in the coal seam can be suddenly sprayed into roadways or stopes in a short period of time. In this process, many factors such as gas pressure, crustal stress and coal strength will have an impact on the occurrence of the coal and gas outburst. Besides, the underground geological structure of the coal mines, coal mining manners, and the like will also change the crustal stress and the gas pressure, which will further affect the occurrence of the coal and gas outburst. Therefore, it is very difficult to predict the coal and gas outburst affected by multiple factors.

At this stage, traditional coal and gas outburst prediction methods mainly include gas pressure and gas content prediction methods. However, the testing time of gas pressure and gas content is more than half a month, the test cost is relatively high, this prediction method only considers the single factor of the gas pressure or the gas content, and the critical value of the prediction index will be different along with different mines in different regions, so that these factors lead to low accuracy of coal and gas outburst prediction results. In addition, many scientific researchers have improved and innovated a regional outburst risk prediction technology, and developed a series of new regional outburst risk prediction methods, such as an electromagnetic method, an artificial intelligence method and a direct current method, through technology introduction. These methods have completely changed an original regional prediction index system, which are relatively unfamiliar to coal mine workers, the general adaptability of the technology needs to be strengthened, and the degree of application and promotion is not high.

SUMMARY OF THE INVENTION

Aiming at the difficult problem of coal and gas outburst prediction, a primary objective of the present invention aims to overcome the deficiencies of the prior art, and to provide a prediction method for coal and gas outburst based on comparing borehole gas flow curves. The prediction method is short in time, low in cost and high in accuracy, can be used for solving the problem of low efficiency of coal and gas outburst prediction, and plays a good guiding role in the safe production of coal mines.

In order to achieve the objective, the present invention is to provide a prediction method for coal and gas outburst based on comparing borehole gas flow curves comprising following steps under a same coal seam condition in a same coal mine:

(A) Constructing a No. 1 seam-crossing borehole and determining a gas pressure $P_{determination\ 1}$ of a coal seam.

(B) judging the determined gas pressure $P_{determination\ 1}$ of the coal seam, if the determined gas pressure $P_{determination\ 1}$ of the coal seam is greater than or equal to 0.70 megapascal (MPa) and smaller than or equal to 0.74 MPa, testing a first gas flow at each time t in a delayed manner to be used as a reference gas flow $Q(t)_{reference}$, and directly executing step (H).

(C) If $P_{determination\ 1}$ is smaller than 0.70 MPa or $P_{determination\ 1}$ is greater than 0.74 MPa, testing a gas flow $Q(t)_{test\ 1}$ at each time t in the delayed manner, and executing step (D) to step (F).

(D) Constructing a No. 2 seam-crossing borehole and determining a gas pressure $P_{determination\ 2}$ of the coal seam.

(E) Judging the determined gas pressure $P_{determination\ 2}$ of the coal seam, if the determined gas pressure $P_{determination\ 2}$ of the coal seam is greater than or equal to 0.70 MPa and smaller than or equal to 0.74 MPa, testing a second gas flow at each time t in the delayed manner to be used as the reference gas flow $Q(t)_{reference}$, and directly executing step (H).

(F) If $P_{determination\ 2}$ is smaller than 0.70 MPa or $P_{determination\ 2}$ is greater than 0.74 MPa, testing a gas flow $Q(t)_{test\ 2}$ at each time t in the delayed manner, and executing step (G).

(G) Calculating a third gas flow corresponding to a critical gas pressure P to be used as the reference gas flow $Q(t)_{reference}$.

(H) Performing a linear regression on the reference gas flow $Q(t)_{reference}$ obtained in the step (B) or the step (E) or the step (G), and using a formed borehole gas flow curve as a reference flow curve.

(I) Constructing a predicted seam-crossing borehole in a predicted area, and directly testing the gas flow at each time t in the delayed manner to be used as a predicted gas flow $Q(t)_{prediction}$.

(J) Performing the linear regression on the predicted gas flow $Q(t)_{prediction}$, and using a formed gas flow curve as a predicted flow curve.

(K) Judging whether the predicted flow curve is above the reference flow curve or whether the predicted flow curve intersects with the reference flow curve, if yes, predicting that the coal seam in the predicted area has a risk of coal and gas outburst, or else, predicting that the coal seam in the predicted area does not have the risk of coal and gas outburst.

Further, in the step (G), the gas flow corresponding to the critical gas pressure is calculated, and a following formula is used for calculation:

$$D(t) = \frac{Q(t)_{test\,1} - Q(t)_{test\,2}}{P_{determination\,1} - P_{determination\,2}},$$

wherein D(t) is a gas pressure coefficient which indicates a difference value of gas flow at each time t under a condition that there is a difference of 1 MPa between gas pressure, and t is 0.08 hour, 0.5 hour, 1 hour, 2 hours, 3 hours, 4 hours, 5 hours, 10 hours, 24 hours, 48 hours, 72 hours, 96 hours, 120 hours; if $|P-P_{determination\,1}| < |P-P_{determination\,2}|$, wherein P is the critical gas pressure, P=0.74 MPa, a following formula is used for calculation:

$$Q(t)_{reference} = Q(t)_{test\,1} + (0.74 - P_{determination\,1}) \cdot D(t),$$

and the gas flow at each time t, corresponding to the critical gas pressure P=0.74 MPa, is calculated and used as a reference gas flow $Q(t)_{reference}$; if $|P-P_{determination\,1}| \geq |P-P_{determination\,2}|$, wherein P is the critical gas pressure, P=0.74 MPa, a following formula is used for calculation:

$$Q(t)_{reference} = Q(t)_{test\,2} + (0.74 - P_{determination\,2}) \cdot D(t),$$

and the gas flow at each time t, corresponding to the critical gas pressure P=0.74 MPa, is calculated and used as the reference gas flow $Q(t)_{reference}$.

Further, testing the gas flow at each time t in the delayed manner means respectively testing the gas flow when each time t is 0.08 hour, 0.5 hour, 1 hour, 2 hours, 3 hours, 4 hours, 5 hours, 10 hours, 24 hours, 48 hours, 72 hours, 96 hours and 120 hours in the delayed manner.

Further, performing the linear regression on the reference gas flow $Q(t)_{reference}$ means selecting a curve with a highest fitting degree from exponential function curves, or power function curves or polynomial function curves.

Further, performing the linear regression on the predicted gas flow $Q(t)_{prediction}$ means selecting a curve with a highest fitting degree from exponential function curves, or power function curves or polynomial function curves.

Compared with the prior art, the present invention has the following advantages when using the above-mentioned technical solution:

The prediction method disclosed by the present invention can be effectively applied to the prediction of coal and gas outburst. Compared with the currently commonly-used prediction methods such as gas pressure and gas content, borehole gas flow test has the advantages of simple test steps, short test time, low cost and the like. The method using flow curve comparison for prediction also overcomes the defect of low prediction accuracy of a single flow index, and ensures the accuracy of the prediction.

DETAILED DESCRIPTION OF THE PREFERRED EMBODIMENT

The technical solutions in embodiments of the present invention will be clearly and fully described below in connection with the accompanying drawings in embodiments of the present invention, and it will be apparent that the described embodiments are only some but not all embodiments of the present invention. Based on the embodiments in the present invention, all other embodiments obtained by a person of ordinary skill in the art without making inventive effort are within the scope of protection of the present invention.

Embodiment 1

Figure 1A:
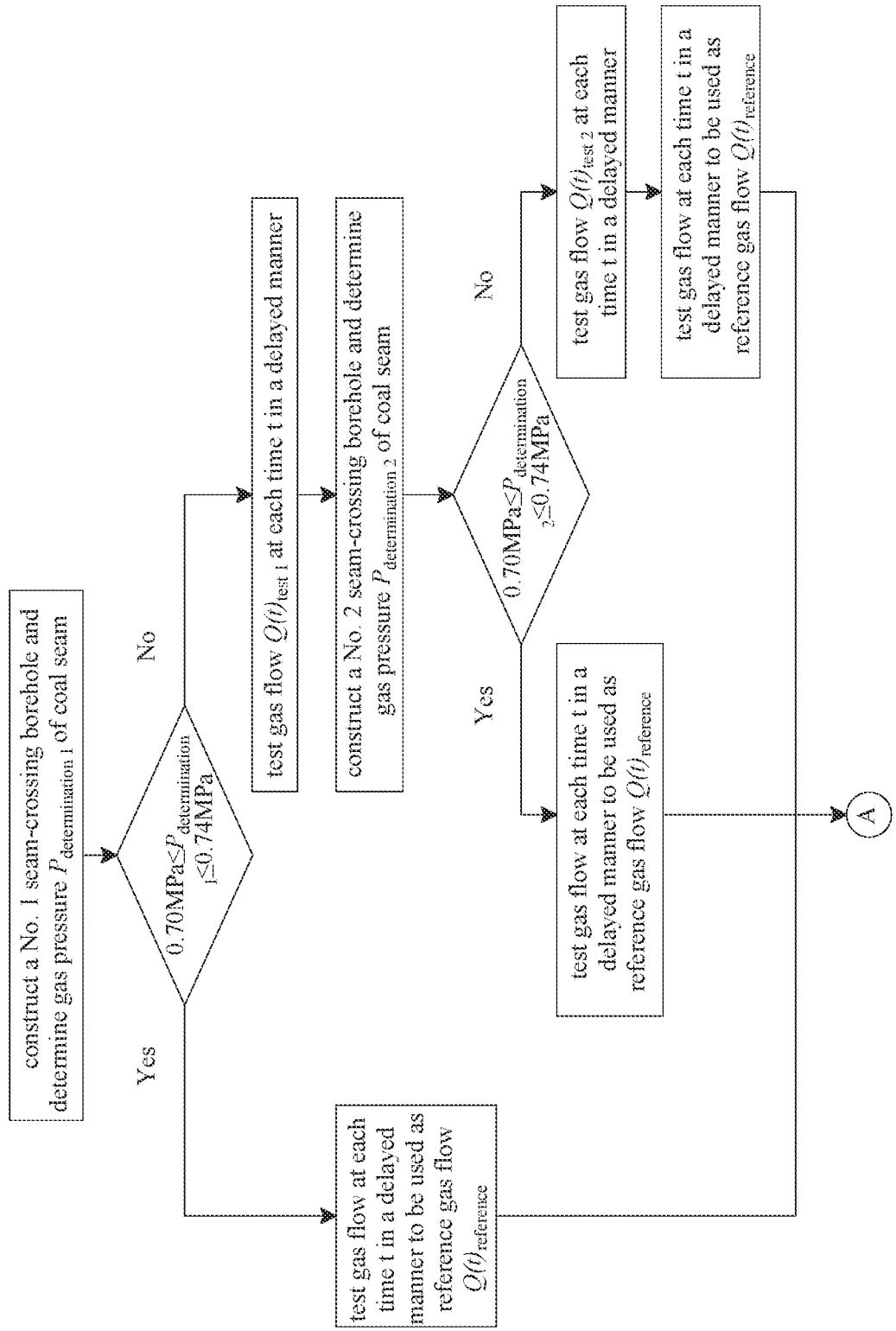
FIG. 1A is a flowchart of step (A) to step (G) of a prediction method for coal and gas outburst based on comparing borehole gas flow curves according to the present invention.
Figure 1B:
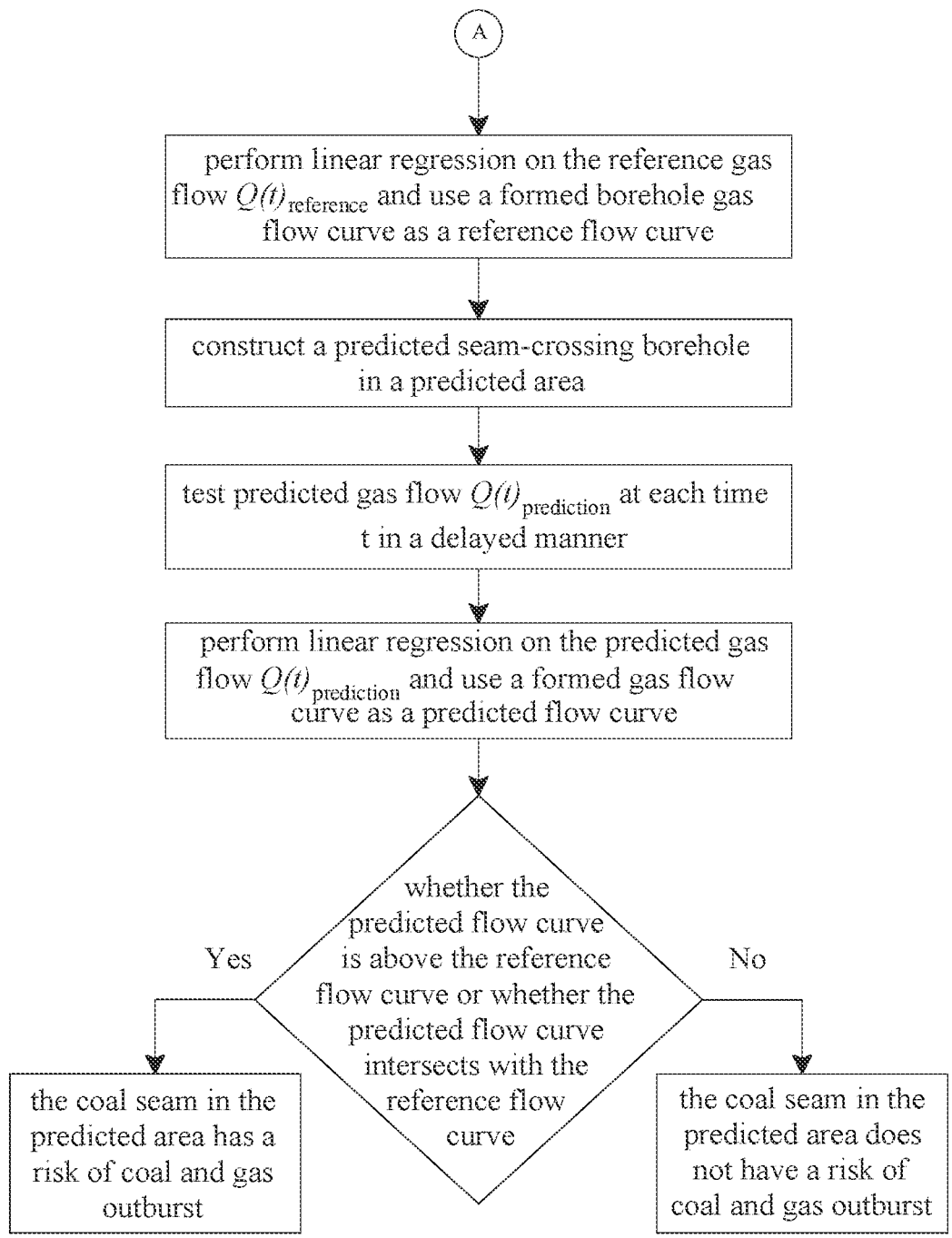
FIG. 1B is a flowchart of step (H) to step (K) of a prediction method for coal and gas outburst based on comparing borehole gas flow curves according to the present invention.
Figure 2:
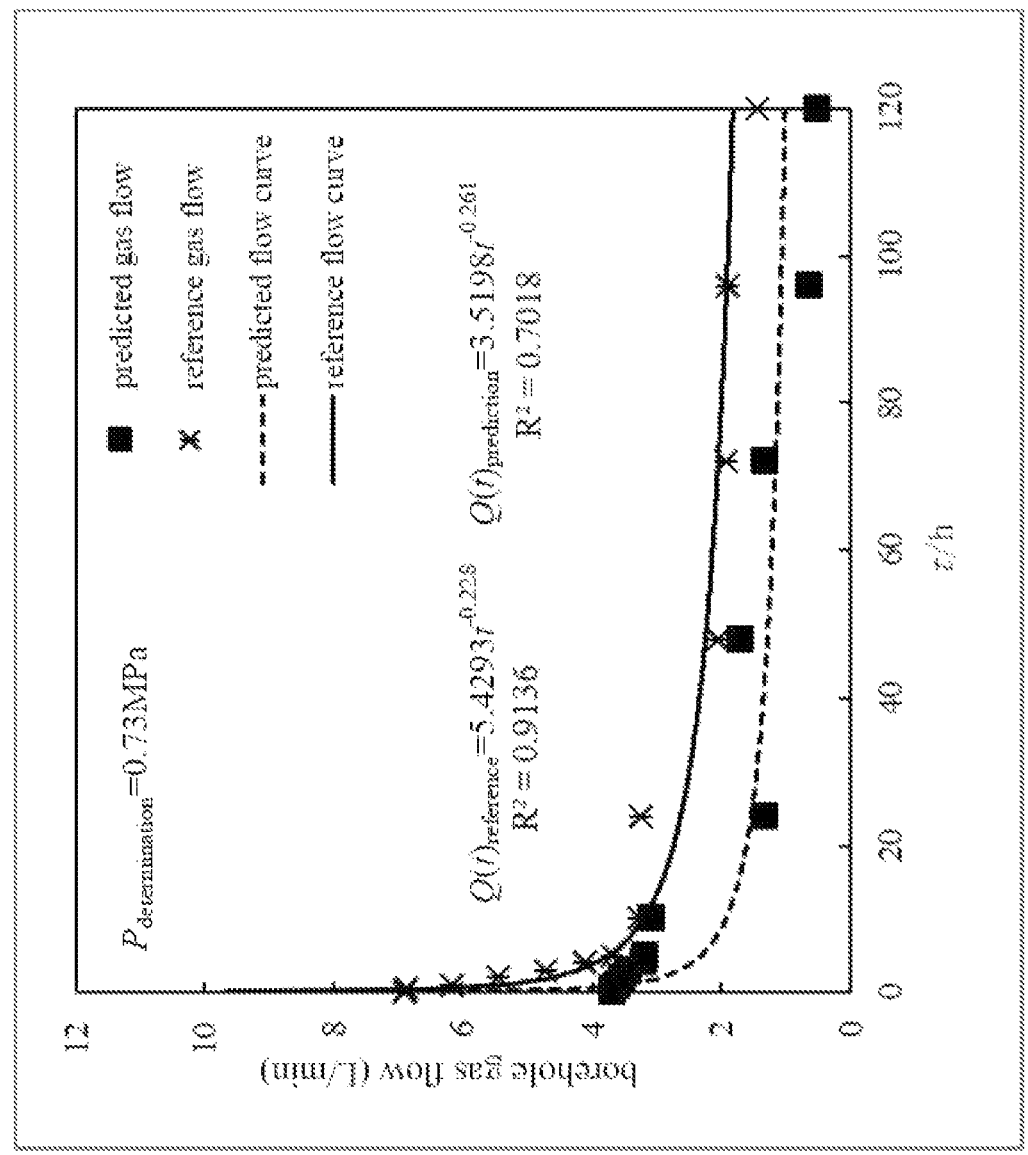
FIG. 2 is a schematic diagram of comparison of a reference flow curve and a predicted flow curve, obtained through measuring points in embodiment 1.

With reference to FIG. 1A, FIG. 1B and FIG. 2, a prediction method for coal and gas outburst based on comparing borehole gas flow curves includes following steps under a same coal seam condition in a same coal mine:

(A) Constructing a No. 1 seam-crossing borehole and determining a gas pressure $P_{determination\,1}$ of a coal seam to be equal to 0.73 MPa.

(B) Judging the determined gas pressure $P_{determination\,1}$ of the coal seam, if the determined gas pressure $P_{determination\,1}$ of the coal seam is greater than or equal to 0.70 MPa and smaller than or equal to 0.74 MPa, testing a first gas flow when each time t is 0.08 hour, 0.5 hour, 1 hour, 2 hours, 3 hours, 4 hours, 5 hours, 10 hours, 24 hours, 48 hours, 72 hours, 96 hours and 120 hours in a delayed manner to be used as reference gas flow $Q(t)_{reference}$.

(H) Performing a power function linear regression on the reference gas flow $Q(t)_{reference}$, so as to obtain $Q(t)_{reference} = 5.4294 t^{-0.228}$ as a reference flow curve, wherein a fitting degree is $R^2 = 0.9136$.

(I) Constructing a predicted seam-crossing borehole in a predicted area (the predicted area is located in the same coal seam of the same coal mine as the No. 1 seam-crossing borehole constructed in the step (A), and has the same or similar parameters as the No. 1 borehole constructed in the step (A), and the borehole parameters mainly include borehole inclination, rock hole length and coal seam hole length), and testing the predicted gas flow $Q(t)_{prediction}$ when each time t is 0.08 hour, 0.5 hour, 1 hour, 2 hours, 3 hours, 4 hours, 5 hours, 10 hours, 24 hours, 48 hours, 72 hours, 96 hours and 120 hours in the delayed manner.

(J) Performing the power function linear regression on the predicted gas flow $Q(t)_{prediction}$, so as to obtain a gas flow curve as a predicted flow curve $Q(t)_{prediction} = 3.5198 t^{-0.261}$, wherein a fitting degree is $R^2 = 0.7018$.

(K) Judging whether the predicted flow curve is above the reference flow curve or whether the predicted flow curve intersects with the reference flow curve, if yes, predicting that the coal seam in the predicted area has a risk of coal and gas outburst, or else, predicting that the coal seam in the predicted area does not have the risk of coal and gas outburst.

As shown in FIG. 2, the predicted flow curve $Q(t)_{prediction}$ in the embodiment 1 is below the reference flow curve $Q(t)_{reference}$, so that the predicted area does not have coal and gas outburst risk.

Embodiment 2

Figure 3:
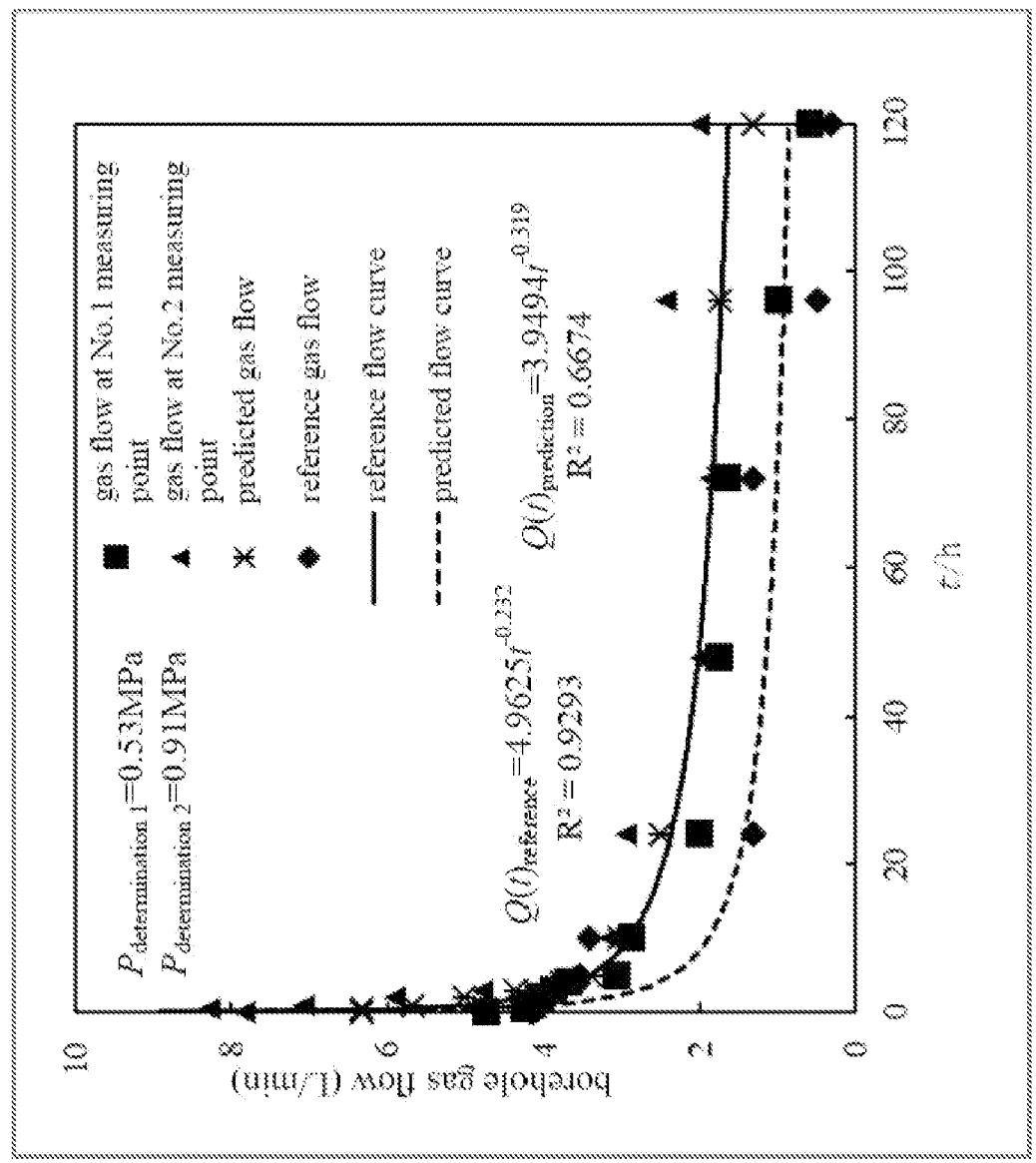
FIG. 3 is a schematic diagram of comparison of the reference flow curve and the predicted flow curve, obtained through calculation in embodiment 2.

With reference to FIG. 1A, FIG. 1B and FIG. 3, a prediction method for coal and gas outburst based on comparing borehole gas flow curves includes following steps under a same coal seam condition in a same coal mine:

(A) Constructing a No. 1 seam-crossing borehole and determining a gas pressure $P_{determination\ 1}$ of a coal seam to be equal to 0.53 MPa.

(B) If the formula that $P_{determination\ 1}$ is greater than or equal to 0.70 MPa and smaller than or equal to 0.74 MPa fails, executing the following step (C).

(C) If $P_{determination\ 1}$ is smaller than 0.70 MPa, testing a gas flow $Q(t)_{test\ 1}$ when each time t is 0.08 hour, 0.5 hour, 1 hour, 2 hours, 3 hours, 4 hours, 5 hours, 10 hours, 24 hours, 48 hours, 72 hours, 96 hours and 120 hours in the delayed manner.

(D) Constructing a No. 2 seam-crossing borehole and determining a gas pressure $P_{determination\ 2}$ of the coal seam to be equal to 0.91 MPa.

(E) If the formula that $P_{determination\ 2}$ is greater than or equal to 0.70 MPa and smaller than or equal to 0.74 MPa fails, executing the following step (F).

(F) If $P_{determination\ 2}$ is greater than 0.74 MPa, testing a gas flow $Q(t)_{test\ 2}$ when each time t is 0.08 hour, 0.5 hour, 1 hour, 2 hours, 3 hours, 4 hours, 5 hours, 10 hours, 24 hours, 48 hours, 72 hours, 96 hours and 120 hours in the delayed manner.

(G) Calculating a third gas flow corresponding to a critical gas pressure P to be used as the reference gas flow $Q(t)_{reference}$, wherein a following formula is used for calculation:

$$D(t) = \frac{Q(t)_{test1} - Q(t)_{test2}}{P_{determination1} - P_{determination2}},$$

wherein D(t) is a gas pressure coefficient which indicates a difference value of gas flow at each time t under a condition that there is a difference of 1 MPa between gas pressure, and t is 0.08 hour, 0.5 hour, 1 hour, 2 hours, 3 hours, 4 hours, 5 hours, 10 hours, 24 hours, 48 hours, 72 hours, 96 hours, 120 hours;

and besides, $|P-P_{determination\ 1}|=|0.74-0.53|=0.21 > |P-P_{determination\ 2}|=|0.74-0.91|=0.17$, wherein P is the critical gas pressure, P=0.74 MPa, a following formula is used for calculation:

$$Q(t)_{reference} = Q(t)_{test\ 2} + (0.74 - P_{determination\ 2}) \cdot D(t),$$

namely calculating the gas flow corresponding to the critical gas pressure P=0.74 MPa as the reference gas flow $Q(t)_{reference}$.

(H) Performing a power function linear regression on the reference gas flow $Q(t)_{reference}$, so as to obtain $Q(t)_{reference}=4.9625t^{-0.232}$ as a reference flow curve, wherein a fitting degree is $R^2=0.9293$.

(I) Constructing a predicted seam-crossing borehole in a predicted area (the predicted area is located in the same coal seam of the same coal mine as the constructed No. 1 seam-crossing borehole and the constructed No. 2 seam-crossing borehole, and has the same or similar parameters as the No. 1 borehole constructed in the step (A) and No. 2 borehole constructed in the step (D), and the borehole parameters mainly include borehole inclination, rock hole length and coal seam hole length), and testing the predicted gas flow $Q(t)_{prediction}$ when each time t is 0.08 hour, 0.5 hour, 1 hour, 2 hours, 3 hours, 4 hours, 5 hours, 10 hours, 24 hours, 48 hours, 72 hours, 96 hours and 120 hours in the delayed manner.

(J) Performing the power function linear regression on the predicted gas flow $Q(t)_{prediction}$, so as to obtain a gas flow curve as a predicted flow curve $Q(t)_{prediction}=3.9494t^{-0.319}$, wherein a fitting degree is $R^2=0.6674$.

(K) Judging whether the predicted flow curve is above the reference flow curve or whether the predicted flow curve intersects with the reference flow curve, if yes, predicting that the coal seam in the predicted area has a risk of coal and gas outburst, or else, predicting that the coal seam in the predicted area does not have the risk of coal and gas outburst.

As shown in FIG. 3, the predicted flow curve $Q(t)_{prediction}$ in the embodiment 2 is below the reference flow curve $Q(t)_{reference}$, so that the predicted area does not have coal and gas outburst risk.

In this paper, several embodiments are used for illustration of the principles and implementations of the present invention. The description of the foregoing embodiments is used to help illustrate the method of the present invention and the core principles thereof. In addition, those of ordinary skilled in the art can make various modifications in terms of specific implementations and scope of application in accordance with the teachings of the present invention. In conclusion, the content of the description shall not be construed as a limitation to the present invention.

What is claimed is:

1. A prediction method for coal and gas outburst based on comparing borehole gas flow curves, under a same coal seam condition in a same coal mine, the prediction method comprising following steps:

(A) constructing a No. 1 seam-crossing borehole and determining a gas pressure $P_{determination\ 1}$ of a coal seam;

(B) judging the determined gas pressure $P_{determination\ 1}$ of the coal seam, if the determined gas pressure $P_{determination\ 1}$ of the coal seam is greater than or equal to 0.70 megapascal (MPa) and smaller than or equal to 0.74 MPa, testing a first gas flow at each time t in a delayed manner to be used as a reference gas flow $Q(t)_{reference}$, and directly executing step (H);

(C) if $P_{determination\ 1}$ is smaller than 0.70 MPa or $P_{determination\ 1}$ is greater than 0.74 MPa, testing a gas flow $Q(t)_{test\ 1}$ at each time t in the delayed manner, and executing step (D) to step (F);

(D) constructing a No. 2 seam-crossing borehole and determining a gas pressure $P_{determination\ 2}$ of the coal seam;

(E) judging the determined gas pressure $P_{determination\ 2}$ of the coal seam, if the determined gas pressure $P_{determination\ 2}$ of the coal seam is greater than or equal to 0.70 MPa and smaller than or equal to 0.74 MPa, testing a second gas flow at each time t in the delayed manner to be used as the reference gas flow $Q(t)_{reference}$, and directly executing step (H);

(F) if $P_{determination\ 2}$ is smaller than 0.70 MPa or $P_{determination\ 2}$ is greater than 0.74 MPa, testing a gas flow $Q(t)_{test\ 2}$ at each time t in the delayed manner, and executing step (G);

(G) calculating a third gas flow corresponding to a critical gas pressure P to be used as the reference gas flow $Q(t)_{reference}$, wherein a following formula is used for calculation:

$$D(t) = \frac{Q(t)_{test\ 1} - Q(t)_{test\ 2}}{P_{determination\ 1} - P_{determination\ 2}},$$

wherein D(t) is a gas pressure coefficient which indicates a difference value of gas flow at each time t under a condition that there is a difference of 1 MPa between gas pressure, and t is 0.08 hour, 0.5 hour, 1 hour, 2 hours, 3 hours, 4 hours, 5 hours, 10 hours, 24 hours, 48 hours, 72 hours, 96 hours, 120 hours;

if $|P-P_{determination\ 1}| < |P-P_{determination\ 2}|$, wherein P is the critical gas pressure, P=0.74 MPa, a following formula is used for calculation:

$Q(t)_{reference} = Q(t)_{test\ 1} + (0.74 - P_{determination\ 1}) \cdot D(t)$, and the gas flow at each time t, corresponding to the critical gas pressure P=0.74 MPa, is calculated and used as the reference gas flow $Q(t)_{reference}$;

if $|P-P_{determination\ 1}| \geq |P-P_{determination\ 2}|$, wherein P is the critical gas pressure, P=0.74 MPa, a following formula is used for calculation:

$Q(t)_{reference} = Q(t)_{test\ 2} + (0.74 - P_{determination\ 2}) \cdot D(t)$, and the gas flow at each time t, corresponding to the critical gas pressure P=0.74 MPa, is calculated and used as the reference gas flow $Q(t)_{reference}$;

(H) performing a linear regression on the reference gas flow $Q(t)_{reference}$ obtained in the step (B) or the step (E) or the step (G), and using a formed borehole gas flow curve as a reference flow curve;

(I) constructing a predicted seam-crossing borehole in a predicted area, and directly testing the gas flow at each time t in the delayed manner to be used as a predicted gas flow $Q(t)_{prediction}$;

(J) performing the linear regression on the predicted gas flow $Q(t)_{prediction}$, and using a formed gas flow curve as a predicted flow curve; and (K) judging whether the predicted flow curve is above the reference flow curve or whether the predicted flow curve intersects with the reference flow curve, if yes, predicting that the coal seam in the predicted area has a risk of coal and gas outburst, or else, predicting that the coal seam in the predicted area does not have the risk of coal and gas outburst.

2. The prediction method of claim 1, wherein testing the gas flow at each time t in the delayed manner means respectively testing the gas flow when each time t is 0.08 hour, 0.5 hour, 1 hour, 2 hours, 3 hours, 4 hours, 5 hours, 10 hours, 24 hours, 48 hours, 72 hours, 96 hours and 120 hours in the delayed manner.

3. The prediction method of claim 1, wherein performing the linear regression on the reference gas flow $Q(t)_{reference}$ means selecting a curve with a highest fitting degree from exponential function curves, or power function curves or polynomial function curves.

4. The prediction method of claim 1, wherein performing the linear regression on the predicted gas flow $Q(t)_{prediction}$ means selecting a curve with a highest fitting degree from exponential function curves, or power function curves or polynomial function curves.

* * * * *